(12) United States Patent
Griffith et al.

(10) Patent No.: US 8,641,154 B2
(45) Date of Patent: Feb. 4, 2014

(54) PARKING BRAKE ADJUSTMENT FOR AN AIRCRAFT HAVING AN ELECTRIC BRAKE SYSTEM

(75) Inventors: T. Todd Griffith, Seattle, WA (US); Pete Goranson, Everett, WA (US); Dan Adkinson, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 1078 days.

(21) Appl. No.: 11/539,863

(22) Filed: Oct. 9, 2006

(65) Prior Publication Data

US 2008/0084109 A1 Apr. 10, 2008

(51) Int. Cl.
*B60T 8/86* (2006.01)

(52) U.S. Cl.
USPC ................................ 303/126; 303/20; 303/89

(58) Field of Classification Search
USPC ....................... 303/126, 89, 191, 20
See application file for complete search history.

(56) References Cited

U.S. PATENT DOCUMENTS

| | | | |
|---|---|---|---|
| 6,095,293 A | 8/2000 | Brundrett et al. | |
| 6,293,632 B1 * | 9/2001 | Grote et al. | 303/112 |
| 6,530,625 B2 * | 3/2003 | Arnold et al. | 303/126 |
| 6,702,069 B2 | 3/2004 | Ralea et al. | |
| 2004/0238299 A1 * | 12/2004 | Ralea et al. | 188/156 |
| 2005/0192733 A1 * | 9/2005 | Dellac et al. | 701/70 |
| 2006/0226698 A1 * | 10/2006 | Riebe et al. | 303/20 |
| 2008/0154443 A1 * | 6/2008 | Godo | 701/3 |

FOREIGN PATENT DOCUMENTS

WO PCT/US2007/018525 8/2007

\* cited by examiner

*Primary Examiner* — Bradley King
(74) *Attorney, Agent, or Firm* — Parsons Behle & Latimer

(57) ABSTRACT

A system and procedures for adjusting brake mechanisms for an aircraft having an electric brake system are disclosed. The brake actuator mechanisms are controlled to achieve different parking brake actuation states as a function of the current engine run status (e.g., engine off, engine idle, or engine above idle). Procedures for adjusting an aircraft parking brake as disclosed herein include setting the brake actuator mechanisms to achieve a relatively low clamping force when the aircraft engines are off or idling, and setting the brake mechanisms to achieve a relatively high clamping force when the aircraft engines are running above idle, and to maintain commanded brake force without active or battery power by engaging a mechanical clutch or latch to the brake actuator.

23 Claims, 4 Drawing Sheets

PARKING BRAKE ADJUSTMENT FOR AN AIRCRAFT HAVING AN ELECTRIC BRAKE SYSTEM

TECHNICAL FIELD

Embodiments of the present invention relate generally to aircraft braking systems. More particularly, embodiments of the present invention relate to the control and actuation of an aircraft parking brake of an electric brake system.

BACKGROUND

Aircraft are usually provided with a parking brake feature that actuates the wheel brakes to prevent the aircraft from rolling when it is parked. In traditional aircraft brake systems, the parking brakes fully actuate the brake mechanisms and mechanically or hydraulically lock the brake mechanisms in their fully actuated positions. In other words, conventional aircraft parking brake systems have only two brake actuation states: completely off or fully on. In most cases full brake actuation is not needed to prevent the aircraft from rolling on the ground. Such full brake actuation can result in excessive loading, fatigue, and stress on the brake mechanisms, especially after many parking brake application cycles. Consequently, the brake mechanisms and surrounding structure of the aircraft are designed to withstand the high loading caused by parking brake actuation. This design objective results in heavy and bulky brake mechanisms and support structures. The additional weight can become significant in large commercial aircraft, which may have eight or more wheel brakes, each utilizing multiple brake actuators. For example, an aircraft may include a total of 32 brake actuators (eight brakes and four brake actuators per brake).

BRIEF SUMMARY

A system and methods are provided for engaging a parking brake for an aircraft having an electric brake system. Actuation of a parking brake as described herein is advantageous because the electric brake system can regulate the amount of brake actuator clamping force in accordance with the current needs of the aircraft. In one embodiment, the electric brake actuators are controlled to provide full clamping forces when the aircraft is parked and the engine(s) are operating above idle, and to provide partial clamping force when the aircraft is parked and the engine(s) are off or idling. Control of the aircraft parking brake in this manner is desirable to reduce loading of the brake system components.

The above and other aspects of the invention may be carried out in one embodiment by a method for controlling an electric brake system for an aircraft. The method involves detecting a current engine run status for the aircraft, and controlling a brake mechanism in the electric brake system to achieve one of a plurality of parking brake actuation states in response to the current engine run status.

The above and other aspects of the invention may be carried out in another embodiment by a method for controlling an electric brake system for an aircraft. This method involves: setting an electric brake actuator with an electric brake actuator controller to achieve a first parking brake actuation state when a current engine run status of the aircraft indicates an engine idle condition; detecting onset of an engine above-idle condition of the aircraft; and in response to the engine above-idle condition, resetting the electric brake actuator with the electric brake actuator controller to achieve a second parking brake actuation state. The first parking brake actuation state corresponds to a relatively low clamping force for the electric brake actuator, and the second parking brake actuation state corresponds to a relatively high clamping force for the electric brake actuator.

The above and other aspects of the invention may be carried out in another embodiment by an electric brake system for an aircraft. The electric brake system includes: a brake mechanism; an instrument configured to detect a current engine run status for the aircraft; and a brake control architecture coupled to the brake mechanism and coupled to the instrument. The brake control architecture is configured to electrically control the brake mechanism to achieve one of a plurality of parking brake actuation states in response to the current engine run status.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIG. 1 and FIG. 2 depict example arrangements of elements, additional intervening elements, devices, features, or components may be present in an embodiment of the invention.

Figure 1:
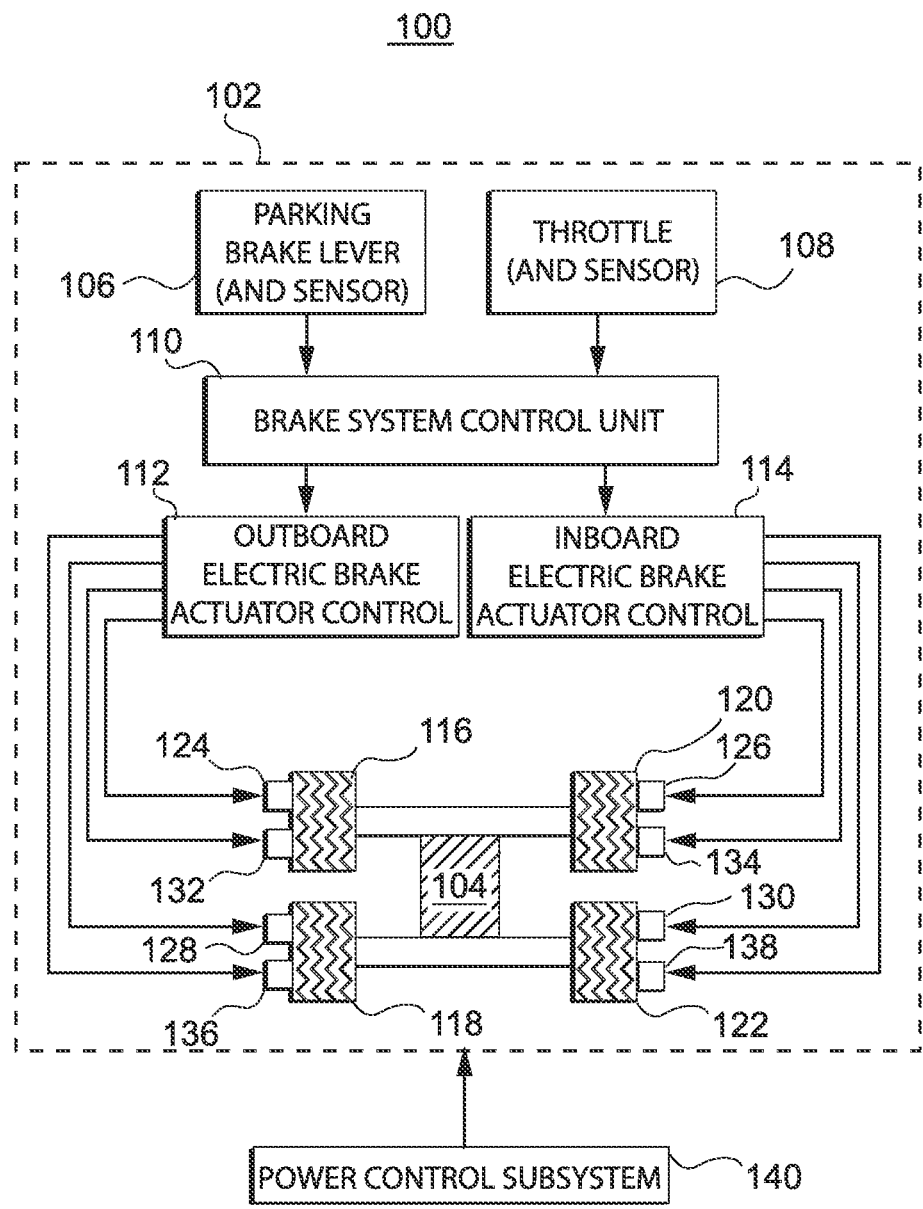
FIG. 1 is a schematic representation of a portion of an electric brake system configured in accordance with an embodiment of the invention.
Figure 2:
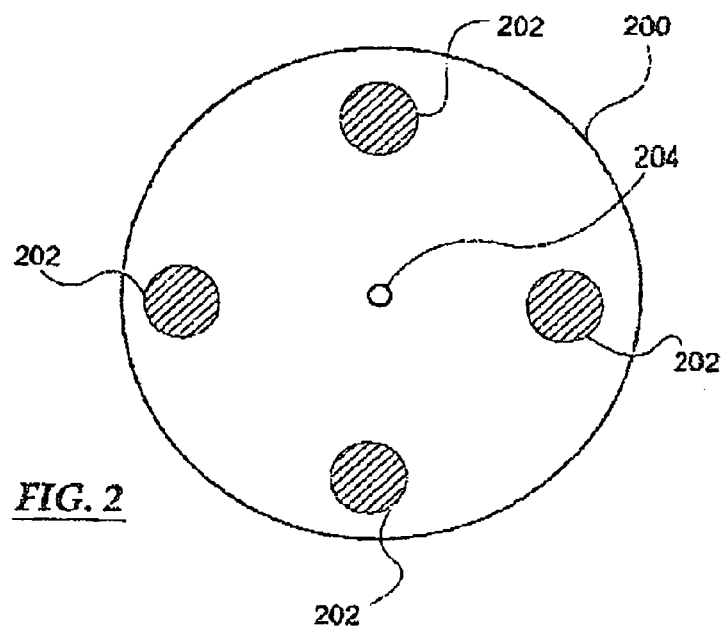
FIG. 2 is a front view of an aircraft brake rotor, illustrating electric brake actuator placement relative to the brake rotor.

FIG. 1 is schematic representation of a portion of an aircraft electric brake system 100 that is configured in accordance with an embodiment of the invention. FIG. 1 depicts one electric brake subsystem architecture 102 (in dashed lines) of electric brake system 100—an aircraft may deploy any number of such subsystem architectures in an electric brake system to provide independent and parallel control of the landing gear brakes. For example, electric brake subsystem architecture 102 may represent a left or port side subsystem that controls the brakes of a left or port side landing gear 104, and the aircraft may employ an equivalent right or starboard side subsystem that controls the brakes of a right or starboard side landing gear. In practice, each electric brake subsystem architecture may be independently controlled in the manner described below.

For this example deployment, electric brake subsystem architecture 102 generally includes: a pilot parking brake lever 106; a throttle control 108; a brake system control unit (BSCU) 110 coupled to pilot parking brake lever 106 and to throttle control 108; an outboard electric brake actuator controller (EBAC) 112 coupled to BSCU 110; an inboard EBAC 114 coupled to BSCU 110; an outboard wheel-brake group that includes a fore wheel-brake 116 and an aft wheel-brake 118; an inboard wheel-brake group that includes a fore wheel-brake 120 and an aft wheel-brake 122; electric brake actuators (reference numbers 124, 126, 128, and 130) coupled to the EBACs, and friction brakes (reference numbers 132, 134, 136, and 138) coupled to the EBACs. The electric brake actuators and the friction brakes correspond to each wheel-brake for electric brake subsystem architecture 102. Although not shown in FIG. 1, an embodiment may have more than one electric brake actuator and more than one friction brake per wheel-brake.

The elements in electric brake subsystem architecture 102 can be coupled together using a data communication bus or any suitable interconnection arrangement or architecture. For example, a digital data communication bus or buses may be configured to communicate EBAC control signals from BSCU 110 to the EBACs, to communicate brake mechanism control signals (e.g., actuator control signals) from the EBACs to the electric brake actuators, to communicate friction brake control signals, etc. Briefly, BSCU 110 reacts to manipulation of pilot parking brake lever 106, reacts to the current throttle position (or the current engine run status), and generates control signals that are received by EBACs 112/114. In turn, EBACs 112/114 generate brake actuator control signals that are received by the electric brake actuators. In turn, the brake actuators engage to impede or prevent rotation of their respective wheels. These features and components are described in more detail below.

Pilot parking brake lever 106 is configured to provide pilot input to electric brake system 100. In one embodiment, the aircraft employs one pilot parking brake lever to control the application of parking brakes for all wheels on the aircraft. In other words, pilot parking brake lever 106 may be shared by both electric brake subsystem architectures on the aircraft. The pilot physically manipulates pilot parking brake lever 106 to engage the parking brake of the aircraft. This engagement of pilot parking brake lever 106 may be measured by a hardware servo or an equivalent component, converted into a parking brake command control signal by a transducer or an equivalent component, and sent to BSCU 110. In this regard, pilot parking brake lever 106 may include or cooperate with a sensor, a detector, or any suitably configured instrument that determines when the pilot parking brake lever 106 is engaged.

Throttle control 108 is configured to provide pilot throttle input to electric brake system 100. In one embodiment, the aircraft employs one throttle control (thus, the data from throttle control 108 may be shared by both electric brake subsystem architectures on the aircraft). As described in more detail below, electric brake system 100 can utilize the throttle input as a means for determining or detecting the current engine run status (throttle level) for the aircraft. The position of throttle control 108 may be measured by a hardware servo or an equivalent component, converted into a throttle level or engine run status control signal by a transducer or an equivalent component, and sent to BSCU 110. In this regard, throttle control 108 may include or cooperate with a sensor, a detector, or any suitably configured instrument that determines the real-time position of throttle control 108.

As used herein, an "engine run status" indicates a particular engine throttle level, a particular position of the aircraft throttle control, whether the engine(s) are on or off, or the like. For example, an electric brake system may be configured to identify the following engine run status conditions, without limitation: engine idle; engine above-idle; and engine off. Although this example contemplates this limited number of engine run status conditions, an embodiment of an electric brake system may be configured to respond to any number of different engine run states (e.g., specific above-idle throttle positions or levels).

An electric brake system may be configured to establish different parking brake actuation states associated with different engine run states of the aircraft. As used herein, a "parking brake actuation state" corresponds to a particular brake mechanism engagement level, a particular clamping force imparted by the electric brake actuator(s), a particular position of the electric motor in the brake mechanism, a particular position or state of the gears and/or linkage in the brake mechanism, a particular position of the electric brake actuator(s), or the like. For example, an electric brake system may be configured to achieve a light/partial parking brake actuation state that corresponds to a relatively low or partial clamping force for the electric brake actuator(s), and a heavy/full parking brake actuation state that corresponds to a relatively high or full clamping force for the electric brake actuator(s). Although this example includes two distinct parking brake actuation states, an embodiment of an electric brake system may be configured to achieve any number of different parking brake actuation states.

BSCU 110 is an electronic control unit that has embedded software that digitally computes EBAC control signals that represent braking commands and parking brake commands. The electrical/software implementation allows further optimization and customization of braking performance and parking brake actuation and control as needed for the given aircraft deployment. As described in more detail below, BSCU 110 is suitably configured to generate brake control signals that govern the actuation of the brake mechanisms in response to the current engine run status and/or in response to the current position of throttle control 108.

BSCU 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, each BSCU in electric brake system 100 is implemented with a computer processor (such as a PowerPC 555) that hosts software and provides external interfaces for the software.

BSCU 110 monitors various aircraft inputs to provide control functions such as, without limitation: pedal braking; parking braking; automated braking; and gear retract braking. In addition, BSCU 110 blends antiskid commands (which could be generated internally or externally from BSCU 110) to provide enhanced control of braking. BSCU 110 obtains pilot command control signals from brake pedals (not shown), along with parking brake command control signals from pilot parking brake lever 106 and throttle level information from throttle control 108. BSCU 110 processes its input signals and generates one or more EBAC control signals that are received by EBACs 112/114. In practice, BSCU 110 transmits the EBAC control signals to EBACs 112/114 via a digital data bus. In a generalized architecture (not shown), each BSCU can generate independent output signals for use with any number of EBACs under its control.

Each EBAC in electric brake system 100 is coupled to and controlled by a BSCU. Each EBAC in electric brake system 100 may be implemented, performed, or realized in the manner described above for BSCU 110. In one embodiment, each EBAC is realized with a computer processor (such as a PowerPC 555) that hosts software, provides external interfaces for the software, and includes suitable processing logic that is configured to carry out the various EBAC operations described herein. In this embodiment, each EBAC 112/114 obtains its respective EBAC control signals from BSCU 110, processes the EBAC control signals, and generates the brake mechanism control signals for the aircraft brake assembly.

Notably, the functionality of BSCU 110 and one or both EBACs 112/114 may be combined into a single processor-based feature or component. In this regard, BSCU 110, EBAC 112, EBAC 114, or any combination thereof can be considered to be a brake control architecture for electric brake system 100. Such a brake control architecture includes suitably configured processing logic, functionality, and features that support the parking brake control operations described herein.

For this embodiment, landing gear 104 includes four wheels, and each wheel preferably includes an associated brake mechanism and at least one electrically controlled brake actuator. Consequently, braking and parking braking for each wheel may be independently and individually controlled by electric brake system 100. Each electric brake actuator is suitably configured to receive actuator control signals from an EBAC, wherein the actuator control signals influence adjustment of the electric brake actuator. In this embodiment, each electric brake actuator in electric brake system 100 is coupled to and controlled by an EBAC. In this manner, EBACs 112/114 control the brake actuators to apply, release, modulate, and otherwise control the application of the parking brakes. In this regard, EBACs 112/114 generate the brake mechanism control signals in response to the respective EBAC control signals generated by BSCU 110. The brake mechanism control signals are suitably formatted and arranged for compatibility with the particular brake mechanism utilized by the aircraft. Those skilled in the art are familiar with aircraft brake mechanisms and the general manner in which they are controlled, and such known aspects will not be described in detail here.

For this example, the brake mechanism for each wheel of the aircraft may include, without limitation: a disc-shaped brake rotor that rotates with the wheel; one or more electric brake actuators; and a plurality of brake stators. In practice, the brake mechanism (or portions thereof) is located within the inboard half of the wheel. The electric brake actuators are controlled by EBACs 112/114 to clamp the brake rotor between the brake stators. FIG. 2 is a front view of an aircraft brake rotor 200, illustrating electric brake actuator placement relative to brake rotor 200 for one embodiment of a brake mechanism. FIG. 2 shows a practical embodiment where four electric brake actuators are utilized for one rotor 200. These four electric brake actuators impart clamping force on rotor 200 at the locations 202 depicted in FIG. 2. Rotor 200 (and the wheel coupled to rotor 200) rotates about an axis 204 that runs through the center of rotor 200. In FIG. 2, axis 204 is perpendicular to the page.

Electric brake subsystem architecture 102 may include or cooperate with a suitably configured power control subsystem 140. Power control subsystem 140 may be coupled to EBACs 112/114 (and/or to other components of electric brake system 100), and power control subsystem 140 may be configured to remove electrical power from, and apply electrical power to, the electric brake actuators as needed. For example, power control subsystem 140 can remove electrical power from the brake mechanisms, the electric brake actuators, and/or other components of electric brake subsystem architecture 102 after engagement of the friction brakes, which maintain the braking force needed for the parking brake. In addition, power control subsystem 140 can reapply electrical power to the brake mechanisms, the electric brake actuators, and/or other components of electric brake subsystem architecture 102 as necessary.

Figure 3:
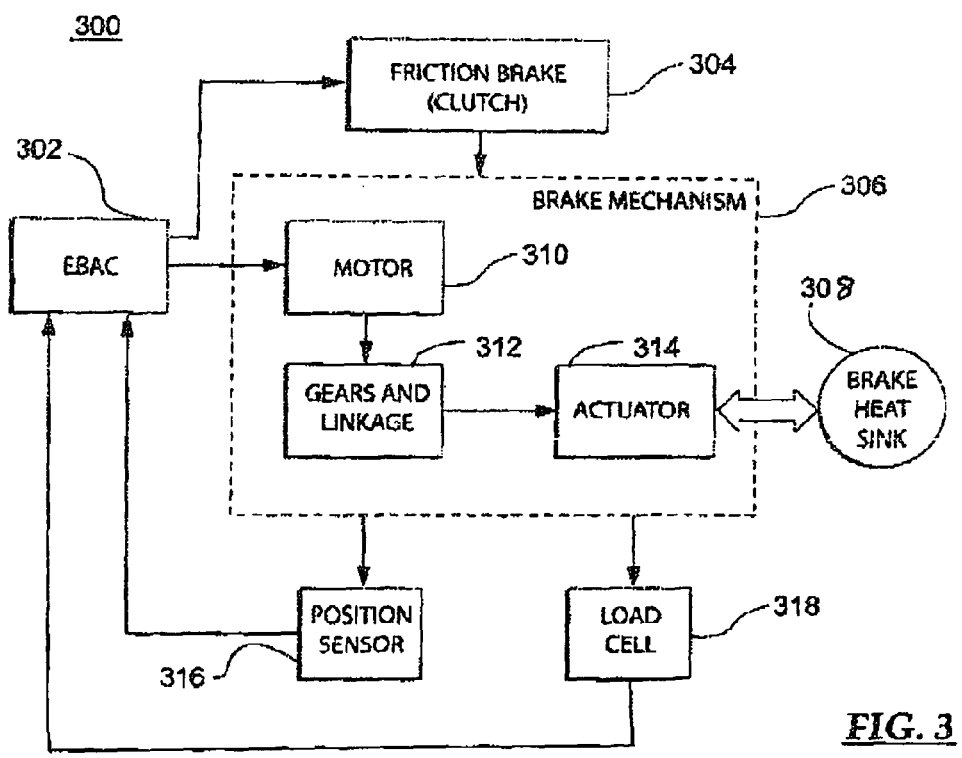
FIG. 3 is a schematic representation of a portion of an electric brake system configured in accordance with an embodiment of the invention.

FIG. 3 is a schematic representation of a portion of an electric brake system 300 configured in accordance with an embodiment of the invention. FIG. 3 is a simplified block diagram that illustrates several components of electric brake system 300. These components may, for example, be implemented in electric brake system 100 (see FIG. 1). Electric brake system 300 may include, without limitation: an EBAC 302; a friction brake or mechanical clutch 304 coupled to and controlled by EBAC 302; a brake mechanism 306 coupled to and controlled by EBAC 302; and a brake heat sink (stators and rotors) 308. Brake mechanism 306 may include, without limitation: an electric motor 310; gears and linkage 312 coupled to electric motor 310; and at least one electric brake actuator 314 coupled to electric motor 310 via gears and linkage 312. Thus, EBAC 302 controls the operation of electric motor 310, which in turn manipulates gears and linkage 312, which in turn causes electric brake actuator 314 to move and impart clamping force on the brake heat sink 308 as needed for braking maneuvers and/or for parking brake actuation as described herein. FIG. 3 depicts a simplified electric brake system 300; in practice, an embodiment may include more than one EBAC, more than one friction brake, and more than one electric brake actuator for each brake heat sink (e.g., four as shown in FIG. 2). Electric brake system 300 may also include one or more sensors, instruments, or transducers, including, without limitation: an actuator position sensor 316; and a load cell 318 or any suitably configured instrument that measures clamping force of electric brake actuator 314. The components shown in FIG. 3 may be coupled together via a data communication bus or any suitably configured interconnection arrangement or architecture.

EBAC 302 may be configured to operate as described above for EBACs 112/114 (see FIG. 1). EBAC 302 controls the position of electric brake actuator 314 and, consequently, the force/pressure applied to the brake heat sink 308. EBAC 302 may receive feedback data from actuator position sensor 316 and/or from load cell 318 to enable electric brake system 300 to determine whether electric brake actuator 314 is sufficiently engaged. For example, a desired parking brake actuation state can be achieved when the measured position of electric brake actuator 314 reaches a designated threshold position as detected by actuator position sensor 316. Alternatively (or additionally), the desired parking brake actuation state can be achieved when the measured clamping force of electric brake actuator 314 reaches a designated threshold clamping force as detected by load cell 318. When the aircraft is parked and the parking brake is engaged, the clamped position of electric brake actuator 314 is held in place by any suitable means, e.g., friction brake 304. To release the braking force or to disengage the parking brake, electric brake actuator 314 is controlled such that it moves and reduces the clamping force on the brake heat sink 308.

Friction brake 304 is suitably configured to maintain brake mechanism 306 in a deployed condition. Accordingly, friction brake 304 cooperates with, and may be coupled to, electric motor 310, gears and linkage 312, and/or electric brake actuator 314. Friction brake 304 represents a mechanical means for engaging and holding brake mechanism 306 and/or electric brake actuator 314 to maintain brake mechanism 306 in its current parking brake actuation state. Notably, friction brake 304 is configured to hold electric brake actuator 314 in place after electrical power has been removed from electric brake actuator 314. Friction brake 304 allows brake mechanism 306 to remain engaged without drawing power from the aircraft battery. In this example, EBAC 302 controls the application of friction brake 304 using suitably formatted control signals.

In one embodiment, EBAC 302 and/or the BSCU that controls EBAC 302 is pre-programmed with a limited number of distinct parking brake actuation states that control the operation of brake mechanism 306 in response to the current engine run status of the aircraft. The following description assumes that the electric brake system employs this scheme. Thus, the brake control architecture is suitably configured to electrically control brake mechanism 306 to achieve one of a plurality of parking brake actuation states in response to the current engine run status. In another embodiment, EBAC 302 and/or the BSCU that controls EBAC 302 is pre-programmed with a continuous (or virtually continuous) parking brake actuation profile that controls the operation of brake mechanism 306 in response to the current engine run status of the aircraft. In yet another embodiment, EBAC 302 and/or the BSCU that controls EBAC 302 can include suitably configured processing logic or software instructions that processes data that indicates current operating conditions (including the current engine run status of the aircraft) and generates a desired parking brake actuation state based upon that data.

Figure 4:
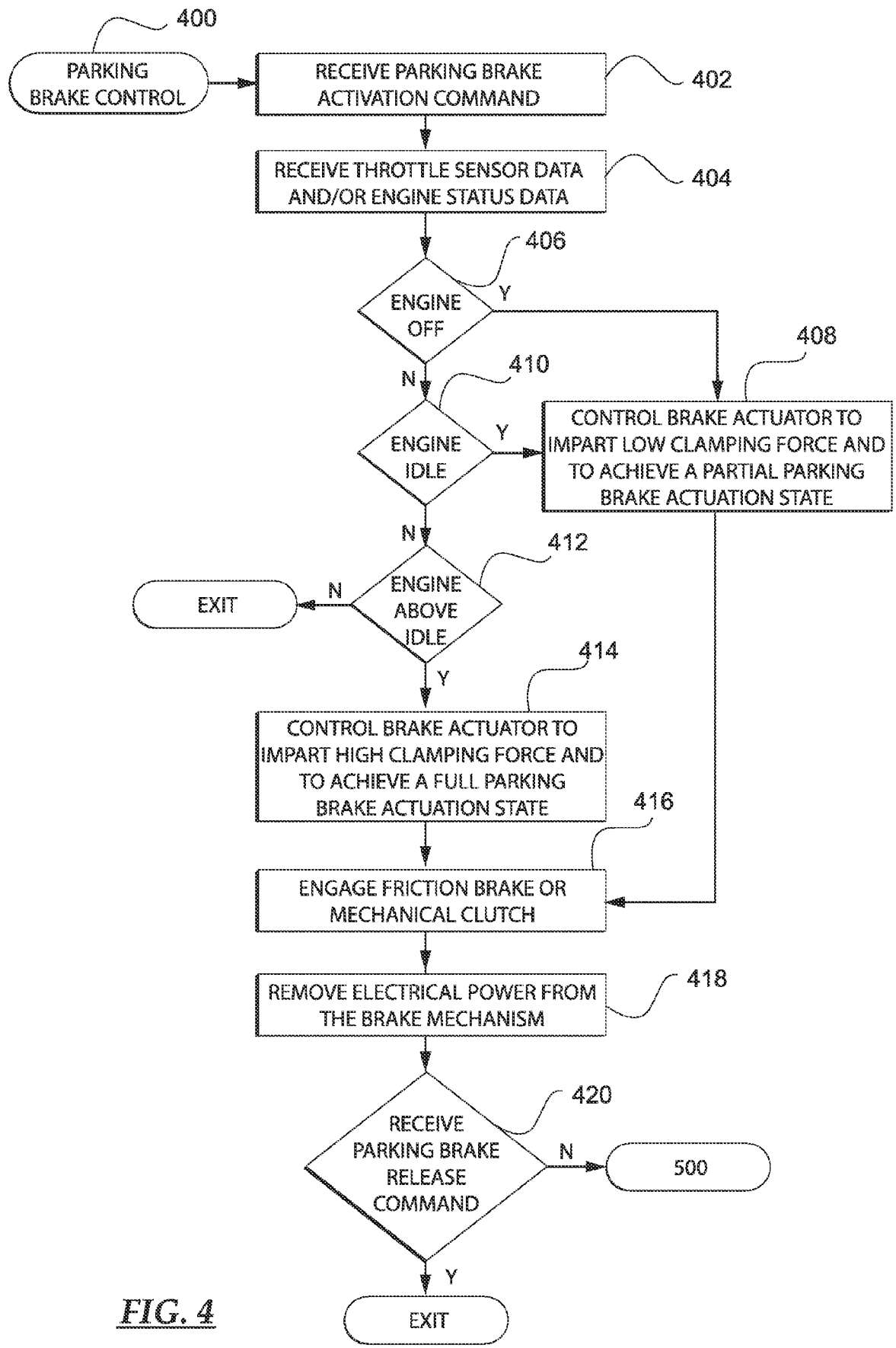
FIG. 4 is a flow chart that illustrates an embodiment of a parking brake control process.

FIG. 4 is a flow chart that illustrates an embodiment of a parking brake control process 400. The various tasks performed in connection with process 400 may be performed by software, hardware, firmware, or any combination thereof. For illustrative purposes, the following description of process 400 may refer to elements mentioned above in connection with FIGS. 1-3. In embodiments of the invention, portions of process 400 may be performed by different elements of the described system, e.g., a BSCU, an EBAC, a brake mechanism (or a component thereof), or a power control subsystem. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Parking brake control process 400 may begin when the electric brake system receives a parking brake activation command (task 402). This command may be generated in response to pilot or ground crew manipulation of the aircraft parking brake lever. As explained above, process 400 may be initiated when the aircraft engines are off or when the aircraft engines are running. Consequently, process 400 may receive throttle sensor data and/or engine status data (task 404) so that the electric brake system can detect the current engine run status for the aircraft.

Parking brake control process 400 can process the throttle sensor data and/or the engine status data in any suitable manner to resolve the current operating state of the aircraft engines. If the current engine run status indicates an "engine off" status (query task 406) or an "engine idle" status (query task 410), then process 400 controls the electric brake actuators in an appropriate manner (task 408) to achieve one of a plurality of parking brake actuation states. For this embodiment, task 408 results in the actuation of the electric brake actuators such that they are set to impart a relatively low clamping force to achieve a partial parking brake actuation state. The specific clamping force corresponding to this partial parking brake actuation state can be pre-engineered to account for the characteristics of the given aircraft and the operating capabilities of the given electric brake system. In some embodiments the low clamping force may range between about 25-30 percent of the total (maximum) clamping force. This partial parking brake actuation state represents at least the minimum brake engagement necessary to prevent the aircraft from rolling on the ground when the engines are running at idle (i.e., little or no measurable thrust). For purposes of this example, the partial clamping force is the same for both engine idle and engine off conditions. In practice, however, the electric brake system can support two different partial parking brake actuation states to accommodate these different situations.

After completion of task 408, parking brake control process 400 may lead to a task 416 (described below). If the current engine run status indicates an "engine above-idle" status (query task 412), then process 400 controls the electric brake actuators in an appropriate manner (task 414) to achieve one of the plurality of parking brake actuation states. If query task 412 does not detect an engine above-idle condition, then process 400 may exit, generate an error message, prompt a different parking brake control scheme, or the like. For this embodiment, task 414 results in the actuation of the electric brake actuators such that they are set to impart a high clamping force, relative to the lower clamping force associated with the engine off and engine idle states. In the preferred embodiment, this higher clamping force represents the full braking capability of the brake mechanism and, consequently, a full parking brake actuation state. In some embodiments the high clamping force may range between about 90-100 percent of the total (maximum) clamping force.

At this point, process 400 has achieved the desired parking brake actuation state (which may either be a partial actuation state or a full actuation state). After completion of task 414, parking brake control process 400 may lead to task 416, which engages one or more mechanical components (such as a friction brake or a mechanical clutch) to maintain the brake mechanism in its current parking brake actuation state. As described above, these mechanical components are configured to mechanically hold the electric brake actuators in place. Thereafter, process 400 can reduce or remove electrical power from the electric brake system, the brake mechanisms, and/or the electric brake actuators (task 418). Since the electric brake actuators are held in place using the friction brakes, they can be safely powered down without losing the parking brake force. Task 418 may be performed to prevent continuous drain of the main aircraft battery.

Parking brake control process 400 may monitor the electric brake system to determine whether the parking brake lever has been released. If the electric brake system receives a parking brake release command or an equivalent control signal (query task 420), then process 400 may exit to allow the electric brake system to process the command in an appropriate manner. For example, the electric brake system may reapply electrical power to the brake mechanisms, release the friction brakes, and control the electric brake actuators such that the brake rotors are free to rotate. If no parking brake release command is received, then process 400 may continue monitoring for a release command or monitor the engine run status to determine whether the brake mechanisms ought to be reset. Parking brake resetting process 500 represents one suitable embodiment of this resetting option.

Figure 5:
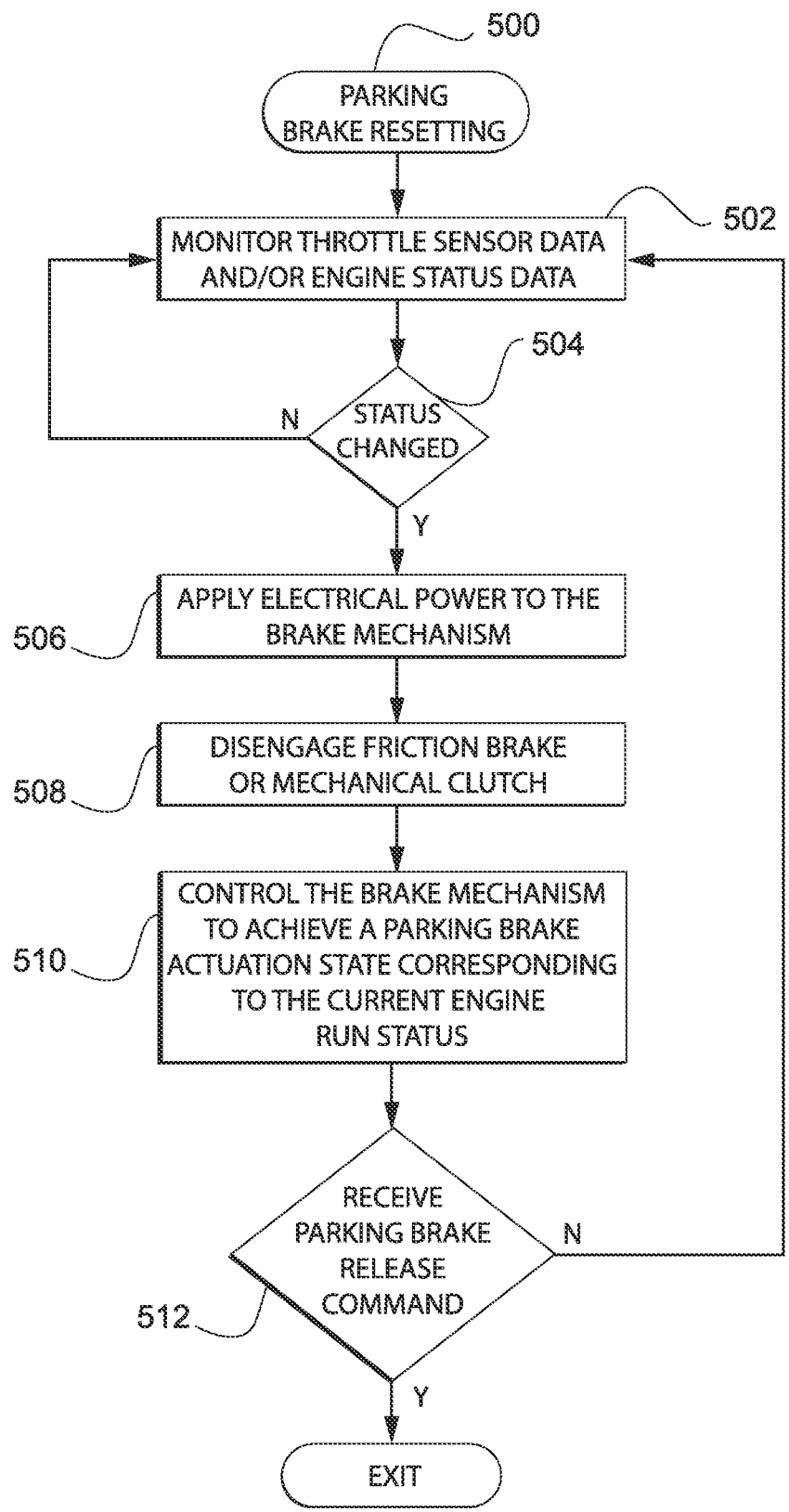
FIG. 5 is a flow chart that illustrates an embodiment of a parking brake resetting process.

FIG. 5 is a flow chart that illustrates an embodiment of parking brake resetting process 500. The various tasks performed in connection with process 500 may be performed by software, hardware, firmware, or any combination thereof. For illustrative purposes, the following description of process 500 may refer to elements mentioned above in connection with FIGS. 1-3. In embodiments of the invention, portions of process 500 may be performed by different elements of the described system, e.g., a BSCU, an EBAC, a brake mechanism (or a component thereof), or a power control subsystem. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Parking brake resetting process 500 can be performed by an electric brake system in response to the initial setting of a parking brake actuation state. Process 500 enables the electric brake system to respond to changes in the current engine run status by adjusting the clamping force of the brake mechanism as needed. For example, it might be desirable to increase the electric brake actuator force if the engine run status changes from "engine idle" or "engine off" to "engine above-idle." On the other hand, it might be desirable to decrease the electric brake actuator force if the engine run status changes from "engine above-idle" to "engine idle" or "engine off."

For purposes of this example, it is assumed that the electric brake actuators have already been set to achieve a partial parking brake actuation state (where the initial engine run status indicates an engine idle condition). In connection with parking brake resetting process 500, the electric brake system can monitor throttle control/sensor data and/or engine status data (task 502) to detect the onset of a different engine run condition. If process 500 determines that the current engine run status has changed (query task 504), then the electrical brake system can reset the brake mechanism as needed to achieve a new parking brake actuation state; otherwise, process 500 may continue monitoring the throttle sensor data and/or the engine run data. In this example, query task 504 detects the onset of an engine above-idle condition of the aircraft.

In response to the new engine run status, parking brake resetting process 500 resets the brake mechanisms to adjust their clamping force and to achieve an updated parking brake actuation state. Process 500 assumes that electrical power was removed from the brake mechanisms after the initial setting of the parking brakes. Therefore, process 500 applies electrical power to the brake mechanisms (task 506) to enable electrical control of the electric brake actuators. Before adjusting the electric brake actuators, process 500 disengages the friction brakes (or mechanical clutches) of the brake mechanisms, thus releasing and unlocking the electric brake actuators (task 508). Thereafter, the electric brake system can control and reset the brake mechanisms and the electric brake actuators to achieve a new parking brake actuation state that corresponds to the current engine run status (task 510). For this example, the electric brake actuators are reset to switch from a relatively low brake clamping force to a relatively high brake clamping force. This switching accommodates the change from the engine idle state to the engine above-idle state, where some thrust may be generated by the aircraft engines.

Although not separately depicted in FIG. 5, parking brake resetting process 500 may engage the friction brakes and remove electrical power from the brake mechanisms after the updated parking brake actuation state has been obtained (see FIG. 4 and the above description of tasks 416 and 418). Process 500 may monitor the electric brake system for a parking brake release command (task 512) and, if such a command is received, process 500 may exit to allow the electric brake system to process the command in an appropriate manner. For example, the electric brake system may reapply electrical power to the brake mechanisms, release the friction brakes, and control the electric brake actuators such that the brake rotors are free to rotate. If no parking brake release command is received, then process 500 may be re-entered at task 502 to continue monitoring for a change in the current engine run status. Thus, in this example, the electric brake system can thereafter detect the onset of a subsequent engine idle condition (or a subsequent engine off condition), and in response thereto again reset the electric brake actuators to the desired parking brake actuation state.

An electric brake system for an aircraft as described herein can be utilized to regulate the parking brake clamping force as a function of the current engine run status and/or throttle level of the aircraft. The applied clamping force can be reduced when the engines are off or when the engines are idling, and increased when the engines are operating above idle. This feature reduces the loading and fatigue stress experienced by the brake actuators, which allows the brake actuators to be efficiently designed for weight savings and compact size.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way.

Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. An electric brake system for an aircraft, the electric brake system comprising:
   a first landing gear comprising a first, fore wheel having a first, fore wheel-brake with a first, fore electric brake actuator, the first landing gear further comprising a second, aft wheel having a second, aft wheel-brake with a second, aft electric brake actuator;
   a parking brake lever;
   a throttle control;
   an instrument configured to sense the position of the throttle control and generate an engine run status control signal indicating an engine run status condition;
   a brake system control unit (BSCU) coupled to the parking brake lever, the throttle control and the instrument via a digital data communication bus, the BSCU comprising a processor configured to generate a first brake control signal in response to a first engine run status control signal and to generate a second brake control signal in response to a second engine run status control signal;
   a first electric brake actuator control (EBAC) coupled to and controlled by the BSCU via the digital data communication bus, and also coupled to both the first, fore electric brake actuator and the second, aft electric brake actuator, the first EBAC comprising a processor configured to generate a first brake actuator control signal in response to the first brake control signal received from the BSCU and to generate a second brake actuator control signal in response to the second brake control signal received from the BSCU,
   wherein the first, fore electric brake actuator and the second, aft electric brake actuator are configured to apply a first clamping force in response to the first brake actuator control signal received from the first EBAC and to apply a second clamping force in response to the second brake actuator control signal received from the first EBAC.

2. The electric brake system of claim 1, wherein the engine run status condition is selected from a group of possible engine run status conditions, the group including an engine off condition, an engine idle condition, and an engine above-idle condition.

3. The electric brake system of claim 1, wherein:
   the first engine run status control signal corresponds to an engine idle condition, and the first clamping force is a partial clamping force; and
   the second engine run status control signal corresponds to an engine above-idle condition, and the second clamping force is a full clamping force.

4. The electric brake system of claim 3, wherein the partial clamping force falls within the range of about 25-30 percent of a maximum clamping force.

5. The electric brake system of claim 3, wherein the full clamping force falls within the range of about 90-100 percent of a maximum clamping force.

6. The electric brake system of claim 1, further comprising:
   a second EBAC coupled to and controlled by the BSCU via the digital data communication bus, and also coupled to a third, fore wheel-brake of a third, fore wheel having a third, fore electric brake actuator and to a fourth, aft wheel-brake of a fourth, aft wheel having a fourth, aft electric brake actuator, the second EBAC comprising a processor configured to generate the first brake actuator control signal in response to the first brake control signal received from the BSCU and to generate the second brake actuator control signal in response to the second brake control signal received from the BSCU,
   wherein the third, fore electric brake actuator of the third, fore wheel-brake and the fourth, aft electric brake actuator of the fourth, aft wheel-brake are configured to apply the first clamping force in response to the first brake actuator control signal received from the second EBAC and to apply the second clamping force in response to the second brake actuator control signal received from the second EBAC.

7. The electric brake system of claim 1, further comprising a power control subsystem coupled to the first EBAC and configured to apply electrical power to or remove electrical power from the first and second electric brake actuators.

8. The electric brake system of claim 1, wherein:
   the first, fore wheel-brake further comprises a first mechanical component configured to hold the first, fore electric brake actuator in place after electrical power has been removed from the first, fore electric brake actuator, and
   the second, aft wheel-brake further comprises a second mechanical component configured to hold the second, aft electric brake actuator in place after electrical power has been removed from the second, aft electric brake actuator.

9. The electric brake system of claim 8, wherein the first mechanical component comprises a friction brake or a mechanical clutch, and the second mechanical component comprises a friction brake or a mechanical clutch.

10. The electric brake system of claim 1, wherein the processor of the BSCU comprises a microprocessor, a controller, a microcontroller, a state machine, a general purpose processor, a content addressable memory, a digital signal processor, an application specific integrated circuit, a field programmable gate array, or a programmable logic device.

11. The electric brake system of claim 1, wherein the processor of the first EBAC comprises a microprocessor, a controller, a microcontroller, a state machine, a general purpose processor, a content addressable memory, a digital signal processor, an application specific integrated circuit, a field programmable gate array, or a programmable logic device.

12. A method for controlling an electric brake system for an aircraft, the method comprising:
   sensing a current engine run status condition;
   generating an engine run status control signal corresponding to the current engine run status condition;
   computing an EBAC control signal in response to the engine run status control signal;
   transmitting the EBAC control signal to a first EBAC via a digital data bus;
   generating a brake actuator control signal with the first EBAC in response to the received EBAC control signal;
   transmitting the brake actuator control signal from the first EBAC to a first, fore electric brake actuator of a first, fore wheel-brake coupled to a first, fore wheel of a first landing gear and to a second, aft electric brake actuator of a second, aft wheel-brake coupled to a second, aft wheel of the first landing gear;
   applying a selected clamping force with the first, fore electric brake actuator to the first, fore wheel-brake; and applying the selected clamping force with the second, aft electric brake actuator to the second, aft wheel-brake, wherein the selected clamping force varies depending on the sensed engine run status condition.

13. The method of claim 12, wherein the engine run status condition is selected from a group of possible engine run status conditions, the group including an engine off condition, an engine idle condition, and an engine above-idle condition.

14. The method of claim 12, wherein a partial clamping force is applied when the engine run status control signal indicates an engine idle condition, and a full clamping force is applied when the engine run status control signal indicates an engine above-idle condition.

15. The method of claim 14, wherein the partial clamping force falls within the range of about 25-30 percent of a maximum clamping force, and the full clamping force falls within the range of about 90-100 percent of the maximum clamping force.

16. The method of claim 12, further comprising:
after applying the selected clamping force, engaging a first mechanical component to hold the first, fore electric brake actuator in place, and engaging a second mechanical component to hold the second, aft electric brake actuator in place; and
after engaging the first and second mechanical components, removing electrical power from the first and second electric brake actuators.

17. The method of claim 16, wherein the first mechanical component comprises a friction brake or a mechanical clutch, and the second mechanical component comprises a friction brake or a mechanical clutch.

18. A method for changing an actuation state of an electric brake system for an aircraft, the method comprising:
sensing a first engine run status condition of the aircraft;
setting the electric brake system in a first brake actuation state corresponding to the first engine run status condition by:
transmitting a first brake actuator control signal from a first EBAC to a first electric brake actuator of a first, fore wheel-brake coupled to a first, fore wheel and to a second electric brake actuator of a second, aft wheel-brake coupled to a second, aft wheel; and
applying a first clamping force with the first electric brake actuator to the first, fore wheel-brake and with the second electric brake actuator to the second, aft wheel-brake,
monitoring the engine run status of the aircraft;
sensing a change in the engine run status of the aircraft from the first engine run status condition to a second engine run status condition;
in response to the changed engine run status condition, changing the electric brake system from the first brake actuation state to a second brake actuation state corresponding to the second engine run status condition without changing the number of electric brake actuators in operation, wherein changing the electric brake system to the second brake actuation state comprises:
transmitting a second brake actuator control signal from the first EBAC to the first electric brake actuator of the first, fore wheel-brake and to the second electric brake actuator of the second, aft wheel-brake; and
applying a second clamping force with the first electric brake actuator to the first fore wheel-brake and with the second electric brake actuator to the second, aft wheel-brake,
wherein the second clamping force is different than the first clamping force.

19. The method of claim 18, wherein the first and second engine run status conditions are selected from a group of possible engine run status conditions, the group including an engine off condition, an engine idle condition, and an engine above-idle condition.

20. The method of claim 18, wherein the first clamping force is a partial clamping force, and the second clamping force is a full clamping force.

21. The method of claim 20, wherein the partial clamping force falls within the range of about 25-30 percent of a maximum clamping force, and the full clamping force falls within the range of about 90-100 percent of the maximum clamping force.

22. The method of claim 18, wherein setting the electric brake system in the second brake actuation state further comprises:
after applying the second clamping force, engaging a first mechanical component to hold the first electric brake actuator in place, and engaging a second mechanical component to hold the second electric brake actuator in place; and
after engaging the first and second mechanical components, removing electrical power from the first and second electric brake actuators.

23. The method of claim 22, wherein the first mechanical component comprises a friction brake or a mechanical clutch, and the second mechanical component comprises a friction brake or a mechanical clutch.

* * * * *